United States Patent Office 3,090,683
Patented May 21, 1963

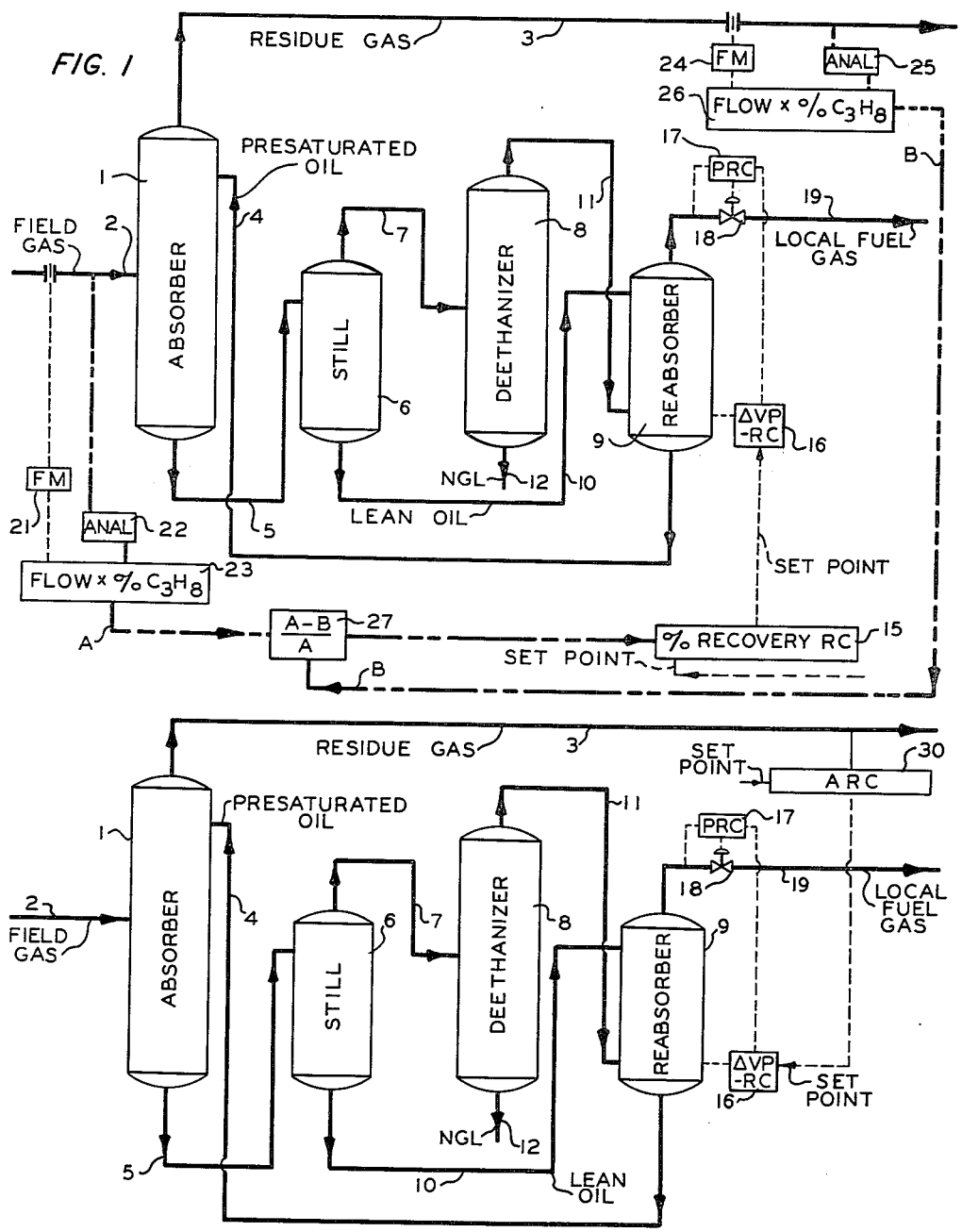

3,090,683
CONTROL OF ABSORBER PRODUCT
Donald E. Berger, Bartlesville, Okla., assignor to Phillips Petroleum Company, a corporation of Delaware
Filed July 12, 1960, Ser. No. 42,376
12 Claims. (Cl. 48—196)

This invention relates to the control of absorption and extractive distillation. In one aspect, the invention relates to a method of and means for regulating the degree of recovery of a certain component from a gas feed stream. In another aspect, the invention relates to a method of and means for regulating the concentration of a certain component in the residue gas stream from an oil absorption or solvent extraction-distillation fractionation system. In still another aspect, the invention relates to the control of the heating value of a residue gas from a gas absorption fractionation system. Another aspect of the invention is the control of the propane content of a residue gas in absorption operations. In another aspect, th einvention relates to the control of a component ratio in a residue gas. In another aspect of the invention, the percentage of propane recovered from a natural gas in an absorption plant is controlled at a substantially constant value by manipulating the propane content of the lean oil to the absorber. In a still further aspect, the invention relates to maintaining the heating value of a residue gas constant by manipulation of the propane content of the lean oil to the absorber. In another aspect, the invention relates to a method of and means for presaturating lean oil. A still further aspect of the invention is the presaturation of a lean oil by controlling the addition of liquid propane to the lean oil from a stripping still. A yet further aspect of the invention is the presaturation of a lean oil by contacting the lean oil with propane vapor and/or a low value stream, such as a deethanizer overhead, in a small reabsorber to produce uniformity of the solvent composition. Another aspect of the invention is the provision of a control loop on the reabsorber wherein a differential vapor pressure controller is utilized to manipulate the reabsorber pressure to obtain the desired degree of presaturation. A still further aspect of the invention is the automatic control of the propane recovery by manipulating the propane content of the lean oil in response to the computed propane recovery, which is based on flow measurements and analyses of both the field gas to the plant and the residue gas from the plant. In another aspect of the invention, the lean oil to the absorber is partially and variably presaturated with propane by contacting the lean oil with deethanizer overhead in a manner responsive to analyses of feed to the absorber and overhead residue gas from the absorber. In another aspect of the invention, it relates to a differential vapor pressure controlled reabsorber for controlling the presaturation of the lean oil wherein the setpoint of the differential pressure controller is manipulated by a controller in which the measurement input is a composition of the residue gas such as the percent propane, a gross heating value measurement in the residue gas such as B.t.u.'s per cubic foot, and/or component ratios in the residue gas such as $(C_3H_8+C_4H_{10})/C_2H_6$, and $C_3H_8/N_2$.

In the operation of a natural gas processing system for the extraction of natural gasoline and liquefied petroleum gas fractions, it is common practice to provide for the recovery of the gaseous residue as a third fraction. It is well understood that in the operation of such a system, the residue gas is subject to wide variations in the composition thereof. The deviation in the composition of such residue gas is such as to require additional processing to bring the residue gas up to desired specifications. It is often desirable that all $C_4+$ hydrocarbons be removed from the natural gas, but only a low percentage, say 10 percent, of propane. It is easy to operate an absorber for the recovery of all $C_4+$ hydrocarbons, but maintaining a substantially constant recovery of propane has been a difficult problem. One method of accomplishing this control is to manually control the flow of lean oil in response to infrequent analysis of the residue gas. However, frequent changes in other absorber variables will, of course, cause the propane content of the residue gas to fluctuate. It is often desirable to produce a gas of constant heating value, but as a result of the changes in composition of the residue gas, the heating value thereof can also vary. It is generally found that the deviation in heating value of such residue gas is such as to require an increase in its heating value, which is usually accomplished by blending with the residue gas a gaseous stream of higher heating value.

I have found that the propane recovery from a natural gas in an absorption plant can be automatically controlled by manipulating the propane content of the lean oil in response to the computed propane recovery, this computed recovery being based on flow measurements and analyses of both the field gas to the plant and the residue gas from the plant. I have further found that the propane content of a lean oil feed to an absorber can be controlled by reabsorbing a portion of the deethanizer overhead gases in this lean oil, manipulating the reabsorber pressure so as to partially saturate the lean oil with the propane. I have also found that the propane content of the lean oil feed can be varied by adding a controlled amount of propane directly to the lean oil. I have further found that the propane content of the lean oil feed to the absorber can be controlled by utilizing a differential vapor pressure controlled reabsorber wherein the setpoint of the differential vapor pressure controller can be additionally manipulated by a controller in which the measurement input is a computed recovery of a component present in the field gas such as propane, a composition measurement in the residue gas such as percent propane a gross heating value measurement in the residue gas, and/or component ratios in the residue gas such as $(C_3H_8+C_4H_{10})/C_2H_6$ and $C_3H_8/N_2$. The ratio of $C_3H_8/N_2$ can well serve to regulate the heating value by compensating for $N_2$ changes in the field gas.

Therefore, it is an object of the present invention to provide a method of and apparatus for automatically controlling the degree of recovery of a certain component from a gas feed stream. It is another object of this invention to regulate the concentration of a certain component in a residue gas stream from an oil absorption or solvent extraction-distillation fractionation system. Another object of the present invention is to maintain the recovery of propane from a natural gas at a substantially constant percentage. Still another object of the present invention is to provide a method of and means for controlling the heating value of a residue gas stream at a predetermined value. Yet another object of the present invention is to control component ratios in a residue gas.

Other aspects, objects and the several advantages of the invention are apparent from a study of the disclosure, the drawing and the appended claims.

In accordance with the invention, there is provided a method of and means for automatically controlling the degree of recovery of a certain component from a gas feed stream. Further, in accordance with the invention, there is provided a method of and means for regulating the concentration of a certain component in a residue gas stream from an oil absorption or solvent extractive-distillation fractionation system. Still further in accordance with the invention, there is provided a method of and means for automatically controlling propane recovery from a natural gas by manipulating the propane content of the lean oil in response to the computed recovery of propane which is based on flow measurements and analyses of both the field gas to the plant and the residue gas from the plant. Still further in accordance with the invention, there is provided a method of and means for automatically controlling the gross heating value of a residue gas from an oil absorption system by partially and variably presaturating the lean oil with deethanizer overhead. Still further in accordance with the invention, there is provided a method of and means for automatically controlling component ratios in a residue gas from a gas absorption system by manipulating the degree of presaturation of a lean oil. Still further in accordance with the present invention there is provided a differential vapor pressure controlled reabsorber wherein deethanizer overhead can be reabsorbed in the lean oil, the degree of reabsorption being manipulated responsive to the desired characteristics of the residue gas.

In the drawing, FIGURE 1 is a schematic flow diagram of a natural gas processing system embodying the present invention. FIGURE 2 is a modification of FIGURE 1.

Referring now to FIGURE 1, field gas is passed into absorber 1 through line 2 and residue gas leaves absorber 1 through overhead line 3. Absorption oil enters absorber 1 through line 4 and after contacting the field gas leaves the absorber through rich oil line 5. Line 5 leads the rich oil to still 6 wherein the absorbed gases are separated from the rich oil and passed out of still 6 through line 7 to deethanizer 8. The lean oil is removed from still 6 and passed to reabsorber 9 through line 10. In deethanizer 8, ethane and lighter gases as well as a portion of the propane are separated and passed to reabsorber 9 through line 11 while the remaining liquids are removed from deethanizer 8 through line 12 as NGL (natural gas liquids).

In a conventional system, the lean oil from still 6 would be recycled through line 10 and line 4 to absorber 1. However, according to the present invention there is provided a reabsorber 9 for partial presaturation of the lean oil with propane which is accomplished by reabsorbing a portion of the deethanizer overhead gases (containing a moderate concentration of propane) with the lean oil. The amount of propane absorbed by the lean oil in the reabsorber is controlled by manipulating the pressure of the reabsorber, i.e., the higher the pressure the greater the amount of propane absorbed. The reabsorber pressure can be directly manipulated in response to a control signal from a controller whose measurement is computed propane recovery in the main absorber, however, it is preferred to utilize a cascade control system wherein the output signal from recovery controller 15 manipulates the setpoint of a differential vapor pressure controller 16 which in turn manipulates the reabsorber pressure. The differential vapor pressure controller 16 determines the difference in vapor pressure between a standard sample and the presaturated oil in the lower section of reabsorber 9 and by means of pressure controller 17 which measures the reabsorber overhead pressure, controls valve 18 in line 19 responsive to absorber pressure, differential vapor pressure and percent propane recovery. This cascade system smoothes the performance of the control system by avoiding or compensating for lags and dead-time in this multiloop system. In addition, the differential vapor pressure controller 16 makes possible the measurement of the propane content of the lean oil. The differential vapor pressure controller can be the type described by D. E. Berger in U.S. Patent 2,825,630, issued March 4, 1958. Very briefly, it compares the vapor pressure of a reference sample of lean oil and propane in a standard cell inserted in the liquid phase of reabsorber 9, with the vapor pressure of the lean oil leaving the reabsorber 9 through line 4. The differential vapor pressure controller 16 then manipulates the reabsorber pressure by operation of valve 18 to obtain the necessary differential vapor pressure between the reference sample and the lean oil leaving the reabsorber as dictated by propane recovery controller 15.

It is within the scope of the present invention to obtain partial presaturation of the lean oil by simply mixing liquid propane with the lean oil. The amount of liquid propane to be added to the lean oil in line 10 would be controlled by a flow ratio control system in which the flow ratio set point of propane to lean oil is manipulated by the control signal from the propane recovery controller 15. Reabsorber 9 would not be required for this method of operation.

The computed propane recovery measurement can be determined as follows:

$$\frac{(\text{Field gas percent } C_3 \times \text{flow rate}) - (\text{residue gas percent } C_3 \times \text{flow rate})}{\text{Field gas percent } C_3 \times \text{flow rate}}$$

Flow meter 21 located in line 2 determines the rate of flow of field gas through line 2 while analyzer 22 determines the concentration of propane in the field gas. The output signals from flow meter 21 and analyzer 22 are fed to a computer 23 which multiplies the signals to obtain the propane input to absorber 1. If this propane concentration is very constant, no analyzer will be required and the flow rate may be multiplied by a constant fraction in computer 23. Flow meter 24 determines the rate of flow of residue gas in line 3 while analyzer 25 determines the concentration of propane in the residue gas. The output signals from flow meter 24 and analyzer 25 are fed to computer 26 which multiplies the signals to obtain the amount of propane in the residue gas. The output signals from computers 23 and 26 are fed to computer 27 which determines the ratio $$\frac{(A-B)}{A}$$

wherein A is the propane input to the absorber and B is the propane remaining in the residue gas. The output signal from computer 27 (percent propane recovery) is fed to controller 15 as its measurement where it is compared with the setpoint value of desired propane recovery. If the computed value of propane recovery equals the setpoint (desired) value, controller 15 takes no action. If the two values do not agree, however, controller 15 manipulates the setpoint of differential vapor pressure controller 16 in proportion to the difference in said values until the computed value of propane recovery does equal the setpoint value. For example, if the setpoint value is 10 percent propane recovery and the computed value is 12 percent, controller 15 will increase the setpoint of controller 16, i.e., will call for an increase in the differential pressure between the reference cell in controller 16 and the bottom of reabsorber 9. Since the reference cell pressure is constant, controller 16 must increase reabsorber pressure in order to obtain the desired increase in differential pressure. Controller 16 thus manipulates the setpoint of pressure controller 17 which in turn partially closes valve 18 and thereby raises absorber 9 pressure. This causes more propane to be absorbed by the lean oil in absorber 9. The resulting increased concentration of propane in partially saturated lean oil in line 4 causes less propane to be absorbed in absorber 1. The computed propane recovery will thus decrease to the desired 10 percent value in response to the corrective action of controller 15. This is a sensitive method of control since a small change in the concentration of propane in the absorption oil will cause a greater change in the concentration of propane in the residue gas.

Referring now to FIGURE 2, there is shown a modification of FIGURE 1 wherein an analyzer-controller 30 determines the characteristics of the residue gas in line 3, such as composition, percent concentration of a particular component, ratios of certain components, or heating value, etc. The output from controller 30 is fed to differential vapor pressure controller 16 as its setpoint. Where it is desired to maintain the concentration of a certain component, such as propane, in the residue gas substantially constant, analyzer-controller 30 determines the concentration of that component in the residue gas, compares this value to the desired value (manual setpoint) in a conventional controller, and adjusts the setpoint of differential vapor pressure controller 16 accordingly. For the purpose of composition analysis, the analyzer portion of controller 30 can be a vapor phase chromatographic analyzer and peak recorder, such as disclosed in copending application Serial Number 727,606, filed April 10, 1958, by Marvin C. Burk, entitled "Chromatographic Analyzer Peak Reader."

It is often desirable to control the heating value of a residue gas stream at a predetermined value. According to the present invention, this can be accomplished by utilizing as analyzer-controller 30 a calorimeter-controller such as disclosed and claimed in U.S. Patent 2,547,970, issued April 10, 1951, to W. L. Phillips et al. The output signal from controller 30 adjusts the setpoint of differential vapor pressure controller 16 in such a manner that more propane is absorbed by the absorber oil in reabsorber 9 whenever the gross heating value of the residue gas decreases and less propane is absorbed by the absorber oil in reabsorber 9 whenever the gross heating value of the residue gas increases.

It is another feature of the present invention to utilize a vapor-phase chromatographic analyzer, peak recorder, and ratio computer for the analyzer portion of controller 30. Ratios such as $(C_3H_8+C_4H_{10})/C_2H_6$ and $C_3H_8/N_2$ have been found to be useful. The ratio $C_3H_8/N_2$ can be used to regulate the heating value of the residue gas by compensating for $N_2$ changes in the field gas.

All of the various components, that is, the flow meters, controllers, computers, etc., are well known in the art and, therefore, details of their construction have not been shown here. For example, computers 23 and 26 are simply multiplying relays and may consist of the Sorteberg Force Bridge, described in Minneapolis-Honeywell Catalog No. C80–1 of September 1956.

Computer 27 performs a subtraction followed by a division. The subtraction function may be performed by a Foxboro M–56 Computing Relay, described in Foxboro Brochure 37–57a of September 12, 1956. The division function may be performed by a Sorteberg Force Bridge, which was previously described.

The differential vapor pressure controller 16 is described by Berger in U.S. Patent 2,825,630, issued March 4, 1958.

Foxboro Model M/40 Controller, described in Foxboro Bulletin 5A–10A of November 1955, may be used for recovery controller 15.

Chromatographic analyzer-controllers 22, 25 and 30 are described by Karasek in ISA Journal of October 1958, page 28. These are also described by Burk, as previously mentioned.

To further describe my invention, the following table is presented in which specific stream compositions are given for the flow diagram of FIGURE 1. These are presented as being typical and should not be interpreted to limit my invention unduly.

*Illustrative Stream Compositions for FIGURE 1*

[Mols/day]

| Component | Field gas (2) | Residue gas (3) | Pre-saturated oil (4) | Rich oil (5) | Still overhead (7) | Lean oil (10) | De-ethanizer overhead (11) | NGL (12) | Re-absorber overhead (19) |
|---|---|---|---|---|---|---|---|---|---|
| $CO_2$ | 627 | 552 | 5 | 80 | 80 | 0 | 80 | 0 | 75 |
| $N_2$ | 5,312 | 5,242 | 4 | 74 | 74 | 0 | 74 | 0 | 70 |
| $CH_4$ | 84,656 | 80,956 | 190 | 3,890 | 3,890 | 0 | 3,890 | 0 | 3,700 |
| $C_2$ | 13,353 | 11,505 | 1,150 | 2,998 | 2,998 | 0 | 2,950 | 48 | 1,800 |
| $C_3$ | 7,096 | 6,301 | 1,905 | 2,700 | 2,700 | 0 | 2,055 | 645 | 150 |
| $nC_4$ | 2,224 | 0 | 0 | 2,224 | 2,224 | 0 | 0 | 2,224 | 0 |
| $iC_4$ | 582 | 0 | 0 | 582 | 582 | 0 | 0 | 582 | 0 |
| $nC_5$ | 526 | 1 | 12 | 537 | 525 | 12 | 0 | 525 | 0 |
| $iC_5$ | 539 | 0 | 0 | 539 | 539 | 0 | 0 | 539 | 0 |
| $C_6$ | 339 | 3 | 143 | 479 | 336 | 143 | 0 | 336 | 0 |
| $C_7$ | 125 | 5 | 475 | 595 | 120 | 475 | 0 | 120 | 0 |
| $C_8+$ | 33 | 10 | 17,027 | 17,050 | 23 | 17,027 | 0 | 23 | 0 |
| Total | 115,412 | 104,575 | 20,911 | 31,748 | 14,091 | 17,657 | 9,049 | 5,042 | 5,795 |

Reasonable variation and modification are possible within the scope of the foregoing disclosure, the drawing, and the appended claims to the invention the essence of which is the composition, heating value, or component ratios of the residue gas, or percent recovery of a particular component in the field gas in a natural gas absorption system can be controlled by presaturating the absorber oil in a reabsorber responsive to the composition, heating value, or component ratios of the residue gas, or percent recovery of a particular component in the field gas in a natural gas absorption system can be controlled by presaturating the absorber oil in a reabsorber responsive to the composition, heating valve, or component ratios of the residue gas, or computed recovery of a particular component respectively.

I claim:

1. A method of controlling the percentage of propane recovery from a natural gas in an absorption system, comprising passing the field gas into an absorber, establishing a first signal representative of the rate of flow of said field gas into said absorber, establishing a second signal representative of the percentage of propane in said field gas as it passes into said absorber, establishing a third signal representative of the rate of flow of propane into said absorber responsive to the product of said first signal and said second signal, injecting a partially presaturated absorber oil into said absorber to contact said field gas and absorb certain components of said field gas, removing the unabsorbed gases as residue gas, withdrawing from said absorber the rich absorber oil, passing said rich absorber oil into a still and therein separating the absorbed gases from said rich absorber oil, passing the gases thus obtained in said still to a deethanizer, removing in said deethanizer ethane and lighter gases and some propane as overhead, passing the lean absorber oil from said still into a reabsorber, passing at least a portion of said overhead from said deethanizer into said reabsorber and into contact with said lean absorber oil, establishing a fourth signal representative of the pressure of the overhead of said reabsorber, establishing a fifth signal representative of the vapor pressure of a standard sample of propane and lean oil, said standard sample being located in the liquid phase in said reabsorber, establishing with a differential vapor pressure controller a sixth signal representative of the differential vapor pressure between said standard sample and the partially saturated absorber oil from the reabsorber, controlling the pressure of said overhead of said reabsorber responsive to said sixth signal and a setpoint on said differential vapor pressure controller, establishing a seventh signal representative of the rate of flow of said residue gas, establishing an eighth signal representative of the percentage of propane in said residue gas, establishing a ninth signal representative of the rate of flow of propane in said residue gas responsive to the product of said seventh signal and said eighth signal, establishing a tenth signal representative of the ratio of the difference between said third signal and said ninth signal to said third signal, controlling said setpoint on said differential vapor pressure controller responsive to said tenth signal in such a manner that the pressure of said overhead of said reabsorber is increased, resulting in a greater amount of propane absorbed in the lean oil in said reabsorber upon an increase in said ratio.

2. A method of controlling the percentage of propane recovery from a natural gas in an absorption system comprising partially presaturating the absorber oil with propane, producing a first signal representative of the percentage of propane recovery and controlling the degree of presaturation responsive to said first signal.

3. A method for producing a residue gas of predetermined heating value from a natural gas in an absorber system comprising passing said natural gas into an absorber, injecting a partially and variably presaturated absorber oil into said absorber and into contact with said natural gas to absorb various components from said natural gas, removing the unabsorbed gases as a residue gas, removing the rich absorber oil, separating the absorbed gases from said rich absorber oil, passing the thus treated absorber oil to a reabsorber, deethanizing the thus separated gases, passing at least a portion of the deethanizer overhead into said reabsorber and into contact with said absorber oil, controlling the pressure in said reabsorbed to partially and variably presaturate said absorber oil responsive to the heating value of the residue gas, and passing the thus partially presaturated absorber oil to said absorber.

4. Apparatus comprising an absorber, means to introduce a gas feed into said absorber, means for injecting absorber oil into said absorber, means for removing unabsorbed gases as an overhead residue gas, means for removing the absorber oil rich in absorbed gases, means for separating the absorbed gases from said rich absorber oil, means for deethanizing the thus separated gases, means for reabsorbing at least a portion of the deethanizer overhead in the absorber oil, and means for controlling the pressure in said means for reabsorbing responsive to a characteristic of said residue gas.

5. Apparatus for controlling the percentage of propane recovery from a natural gas comprising, in combination, an absorber, means to introduce a gas feed into said absorber, means for injecting absorber oil into said absorber, means for removing unabsorbed gases as an overhead residue gas, means for removing the absorber oil rich in absorbed gases, means for separating the absorbed gases from said rich absorber oil, means for deethanizing the thus separated gases, means for reabsorbing at least a portion of the deethanizer overhead in the absorber oil, means for determining the computed percent of propane recovery, means for controlling the pressure of said reabsorbing means responsive to said computed percent of propane recovery, an increase in pressure in said reabsorbing means resulting in increased presaturation of said absorber oil, which results in increased propane content in said residue gas.

6. A method for maintaining substantially constant the ratio between selected components in a residue gas from an absorber system comprising passing the gas feed into an absorber, injecting a partially and variably presaturated absorber oil into said absorber and into contact with said gas feed to absorb various components from said gas feed, removing the unabsorbed gases as a residue gas, removing the rich absorber oil, separating the absorbed gases from said rich absorber oil, passing the thus treated absorber oil to a reabsorber, deethanizing the thus separated gases, passing at least a portion of the deethanizer overhead into said reabsorber and into contact with said absorber oil, establishing a first signal representative of said ratio between selected components in said residue gas, controlling the pressure in said reabsorber to partially and variably presaturate said absorber oil responsive to said first signal and passing the thus partially presaturated absorber oil to said absorber.

7. A method of controlling the percentage of propane recovery from a natural gas in an absorption system, comprising passing the field gas into an absorber, establishing a first signal representative of the rate of flow of propane into said absorber, injecting a partially presaturated absorber oil into said absorber to contact said field gas and absorb certain components of said field gas, removing the unabsorbed gases as residue gas, withdrawing from said absorber the rich absorber oil, separating the absorbed gases from said rich absorber oil, passing the gases thus obtained from said rich absorber oil to a deethanizer, removing in said deethanizer ethane and lighter gases and some propane as overhead product, passing the lean absorber oil from said step of separating into a reabsorber, passing at least a portion of said overhead product from said deethanizer into said reabsorber and into contact with said lean absorber oil, establishing a second signal representative of the rate of flow of propane in said residue gas from said absorber, establishing a third signal representative of the ratio of the difference between said first signal and said second signal, to said first signal controlling the pressure of said reabsorber responsive to said third signal in such a manner that the pressure of said reabsorber is increased, resulting in a greater amount of propane absorbed in the lean oil in said reabsorber upon an increase in said ratio.

8. A method of controlling the percentage of recovery of a component from a gas in an absorption system comprising establishing a first signal representative of the rate of flow of said component in said gas as said gas is fed into an absorber, establishing a second signal representative of the rate of flow of said component in the residue gas from said absorber, establishing a third signal representative of the percentage of recovery of said component responsive to the ratio of the difference between said first signal and said second signal to said first signal partially and variably presaturating the absorber oil with said component responsive to said third signal.

9. A method of reducing the absorption of a component in a field gas stream in an absorption system which comprises, establishing a first signal responsive to an analysis of the feed to said absorber, establishing a second signal responsive to an analysis of the overhead residue gas from said absorber, and partially and variably presaturating the absorber oil with said component responsive to said first signal and said second signal.

10. A method for producing a residue gas of predetermined heating value from a natural gas in an absorber system comprising passing said natural gas into an absorber, injecting a partially and variably presaturated absorber oil into said absorber and into contact with said nataural gas to absorb various components from said natural gas, removing the unabsorbed gases as a residue gas, removing the rich absorber oil, separating the absorbed gases from said rich absorber oil, passing the thus treated absorber oil to a reabsorber, deethanizing the thus separated gases, passing at least a portion of the deethanizer overhead product into said reabsorber and into contact with said absorber oil, establishing a first signal representative of the vapor pressure of a reference mixture of lean oil and a preselected component of said natural gas, said reference mixture being located in the liquid phase in said reabsorber, establishing with a differential vapor pressure sensing device a second signal representative of the differential vapor pressure between said reference mixture and the partially saturated absorber oil within the reabsorber, controlling the pressure of said reabsorber responsive to said second signal and a third signal representative of a desired value of differential vapor pressure, manipulating said third signal representative of a desired value of said differential vapor pressure responsive to the determination of said property, and passing the thus partially presaturated absorber oil to said absorber.

11. The method according to claim 10 wherein said preselected component is propane.

12. A method for maintaining substantially constant the ratio between selected components in a residue gas from an absorber system comprising passing the gas feed into an absorber, injecting a partially and variably presaturated absorber oil into said absorber and into contact with said gas feed to absorb various components from said gas feed, removing the unabsorbed gases as a residue gas, removing the rich absorber oil, separating the absorbed gases from said rich absorber oil, passing the thus treated absorber oil to a reabsorber, deethanizing the thus separated gases, passing at least a portion of the deethanizer overhead into said reabsorber and into contact with said absorber oil, establishing a first signal representative of the vapor pressure of a reference mixture of lean oil and a preselected component of said gas feed, said reference mixture being located in the liquid phase in said reabsorber, establishing with a differential vapor pressure sensing device a second signal representative of the differential vapor pressure between said reference mixture and the partially saturated absorber oil within the reabsorber, controlling the pressure of said reabsorber responsive to said second signal and a third signal representative of a desired value of differential vapor pressure, establishing a fourth signal representative of the ratio of said selected components in said residue gas, and manipulating said third signal representative of a desired value of differential vapor pressure responsive to said fourth signal, and passing the thus partially presaturated absorber oil to said absorber.

References Cited in the file of this patent

UNITED STATES PATENTS

| | | |
|---|---|---|
| 2,355,588 | Brandt | Aug. 8, 1944 |
| 2,600,133 | Simms | June 10, 1952 |
| 2,771,149 | Miller et al. | Nov. 20, 1956 |
| 2,933,900 | Hanthorn | Apr. 26, 1960 |